Patented May 13, 1941

2,241,971

UNITED STATES PATENT OFFICE 2,241,971

MALTED MILK BEVERAGE

Martha E. Tucker, Grand Rapids, Mich., assignor to Martha Tucker Mal-Tee Corporation, Grand Rapids, Mich., a corporation of Michigan No Drawing. Application September 22, 1938, Serial No. 231,256

4 Claims. (Cl. 99—25)

The invention relates to a prepared malted milk beverage and the process for producing the same on a commercial basis.

Objects of the invention are as follows:

To commercially provide a completely prepared malted milk beverage containing all of the ingredients that are now used to make a malted milk beverage in homes or soda dispensing fountains and similar places and forming a balanced tasty, finished product that is not ropy, or having a jelly appearance, being free from lumps and undissolved solids and which will eliminate cooked or condensed milk flavor and be smooth, creamy and homogeneous and at the same time hold all of the ingredients in stable uniform dispersion throughout the product, and also be able to regulate any percentage of butter fat content that local or State regulations or laws may require.

The product contains lactic liquid and dry ingredients and can be made in any dairy equipped with an agitation pasteurizer or steam jacketed kettle and an agitator and without expensive equipment ordinarily employed for making similar products of this character.

The dry ingredients are malted milk powder, sugar, stabilizer, salt, and a flavoring agent, such as cocoa, or any other desired flavor.

The liquid ingredients are whole milk and water, if a low percentage of butter fat is required. However, a heavy percentage of butter fat cream pudding. By process of elimination, I found that in order to have a well balanced smooth and homogeneous liquid, the answer to the problem was to keep the total milk solids or serum solids down below the serum solids in ordinary milk of approximately 8½% to an amount between 6½% to 7½% of the beverage. I found that below 6½% serum solids is not enough to enable the stabilizers used to hold all malted milk, cocoa or other flavoring agents in stable suspension or dispersion throughout the product, and when more than 7½% is used the finished product has the appearance of ropy milk or like a pudding or soft jelly. Therefore, whole milk could not be used for the entire liquid because it contains usually 8½% of serum solids. A portion of water is used to cut down the serum solids. If more butter fat is required, a small portion of 40% butter fat cream is used to replace a like amount of water.

The following table shows enough materials required to make 100 quarts of a finished malted milk beverage with the finished product containing 2.43% butter fat and 6.84% milk solids or serum solids. The total solids are 18.45%, which makes a very well-balanced finished beverage and also fulfills the objects of this invention, namely, a malted milk beverage which is smooth and homogeneous, free from a ropy milk condition and is a tasty liquid not having the appearance of soft jelly or a pudding or the like.

| Ingredients | Total dry weight | Total liquid weight | Weight in ounces | Total per cent | Ounces butter fat | Per cent butter fat | Ounces milk solids | Per cent milk solids | Ounces milk water | Ounces other solids | Per cent other solids | Per cent milk water |
|---|---|---|---|---|---|---|---|---|---|---|---|---|
| | | Pounds | | | | | | | | | | |
| Powdered malted milk | 10 lb | | 160 | 4.55 | 12.8 | 0.36 | 64 | 1.82 | | 83.20 | 2.37 | |
| Sugar | 12 lb | | 192 | 5.45 | | | | | | 192.00 | 5.45 | |
| Cocoa | 2 lb | | 32 | .91 | | | | | | 32.00 | .91 | |
| Sodium alginate | 9 oz | | 9 | .25 | | | | | | 9.00 | .25 | |
| Salt | 7 oz | | 7 | .20 | | | | | | 7.00 | .20 | |
| 3½% butter fat whole milk | | 130 | 2,080 | 59.09 | 72.8 | 2.07 | 176.8 | 5.02 | 1,830.4 | | | 52.00 |
| Water (H₂O) | | 65 | 1,040 | 29.55 | | | | | | | | |
| Totals | 24 lb. 16 oz. or 25 lb. | 195 | 3,520 | 100.00 | 85.6 | 2.43 | 240.8 | 6.84 | 1,830.4 | 323.20 | 9.18 | 52.00 | is to be added when the finished product requires more butter fat.

During laboratory experiments I found that an excess amount of milk solids or serum solids will ruin this beverage, that is, the finished product will be ropy and after cooling will have the appearance of soft jelly. It will not pour as a liquid but will take on the appearance of a

|  | Ounces |
|---|---|
| Butter fat | 85.6 |
| Milk solids | 240.8 |
| Other solids | 323.2 |
| Water (H₂O) | 1040.0 |
| Milk water | 1830.4 |
| (Checks) | 3520.0 |

|                          | Per cent |
|--------------------------|---------|
| Per cent other solids    | 9.18    |
| Butter fat               | 2.43    |
| Milk solids              | 6.84    |
| Total solids             | 18.45   |
| Milk water               | 52.00   |
| (H₂O) water              | 29.55   |
| (Checks)                 | 100.00  |

The following table also shows enough ingredients to make 100 quarts of a finished malted milk beverage, but the finished product contains 3.16% butter fat, which meets more State and local requirements than the previous example. The serum solids here are 6.93% and the total solids 19.27%. The appearance of this completed beverage is the same as the described beverage with 2.43% butter fat and there is no detectable difference in the taste.

| Ingredients | Total dry weight | Total liquid weight | Weight in ounces | Total per cent | Ounces butter fat | Per cent butter fat | Ounces milk solids | Per cent milk solids | Ounces milk water | Per cent milk water | Ounces other solids | Per cent other solids |
|---|---|---|---|---|---|---|---|---|---|---|---|---|
|   |   | Pounds |   |   |   |   |   |   |   |   |   |   |
| Powdered malted milk | 10 lb | | 160 | 4.55 | 12.8 | 0.36 | 64.0 | 1.82 | | | 83.20 | 2.37 |
| Sugar | 12 lb | | 192 | 5.45 | | | | | | | 192.0 | 5.45 |
| Cocoa | 2 lb | | 32 | .91 | | | | | | | 32.0 | .91 |
| Sodium alginate | 9 oz | | 9 | .25 | | | | | | | 9.0 | .25 |
| Salt | 7 oz | | 7 | .20 | | | | | | | 7.0 | .20 |
| 3½% butter fat whole milk. | | 130 | 2,080 | 59.09 | 72.8 | 2.07 | 176.8 | 5.02 | 1,830.4 | 52.00 | | |
| 40% butter fat cream | | 4 | 64 | 1.82 | 25.6 | .73 | 3.2 | .09 | 35.2 | 1.00 | | |
| Water (H₂O) | | 61 | 976 | 27.73 | | | | | | | | |
| Totals | 24 lb. 16 oz. or 25 lb. | 195 | 3,520 | 100.00 | 111.2 | 3.16 | 244.0 | 6.93 | 1,865.6 | 53.00 | 323.20 | 9.18 |

|                  | Ounces   |
|------------------|----------|
| Butter fat       | 111.2    |
| Milk solids      | 244.0    |
| Other solids     | 323.2    |
| Water (H₂O)      | 976.0    |
| Milk water       | 1865.6   |
| (Checks)         | 3520.0   |

|                        | Per cent |
|------------------------|---------|
| Per cent other solids  | 9.18    |
| Butter fat             | 3.16    |
| Milk solids            | 6.93    |
| Total solids           | 19.27   |
| Milk water             | 53.00   |
| (H₂O) water            | 27.73   |
| (Checks)               | 100.00  |

If local or State laws or regulations require a higher than 3.16% butter fat content, more cream is added, and that will not increase the serum solids enough to hurt the finished product. For instance, if 12 lbs. of 40% butter fat cream were used instead of 4 lbs., that would add 1.46% butter fat and .18% serum or milk solids to the finished beverage, and the finished beverage would have 4.62% of butter fat content and 7.11% of serum solids, well under the dangerous point of over 7.5% serum solids. I do not believe any regulations require over 4.5% butter fat content in any milk products.

The process of making this completed product is first to mix all of the dry ingredients together thoroughly, so that the dry ingredients are thoroughly commingled and free from lumps and with the various ingredients uniformly distributed throughout the mixture.

Raw whole milk or pasteurized whole milk may be used. If raw whole milk is used, it is placed in a standard pasteurizer equipped with an agitator or a steam jacketed kettle which is equipped with an agitator together with the water, and cream, if used, and this lactic fluid is continuously agitated at all times and heat applied until the fluid is raised to pasteurizing temperature of 142½° to 145° F. and held at that temperature long enough to satisfy local or State requirements, or this lactic fluid may have heat applied until it reaches 175° F. and held there for three or more minutes and thus pasteurize by this "flash" method, if approved by local or State requirements, but at all times this lactic fluid must have continuous agitation. If pasteurized milk is used, it will be only necessary to raise the temperature to 170° F. with continuous agitation. In both cases, the agitation will break down the cream line and thoroughly mix the cream with the serum solids and proteins, so that when this product is at either 170° F. or 175° F. the lactic fluid will be smooth and homogeneous and devoid of any cooked taste. When the lactic fluid reaches 170° F. or 175° F., the dry ingredients are slowly added with continuous agitation until they are completely dissolved in the lactic fluid. However, the temperature should not be allowed to go below 160 degrees F. while adding these dry ingredients, and as the dry ingredients are cold they must be added slowly to avoid reducing the temperature below 160° F. This temperature of 160° F. is necessary to completely dissolve or make soluble the dry ingredients in the lactic fluid. After the dry ingredients are thoroughly dissolved in the lactic fluid with continual agitation, the mixture should be maintained at a temperature between 160 to 165 degrees F. for at least three minutes with continuous agitation in order to allow the dry ingredients to intermingle with the lactic fluid, so that the whole product will be smooth and the solids uniformly distributed throughout the lactic fluid. After this three-minute period, the heat is turned off but agitation is continued until the temperature is reduced and lowered to at least 10 degrees below scaling point, which is 148 degrees F. A temperature of 135 degrees is recommended. This is for the purpose of preventing the formation of any scum on the surface of the product. Agitation is unnecessary after the temperature of the product is reduced to 135 degrees F. and the product can be immediately placed over an ordinary commercial milk cooler or cooled in any other manner that is desirable. Then the product is ready to be bottled or placed in any suitable container for distribution in any desired manner. With the use of this process, the objects of the invention will be accomplished. Also, if desired, the cooled product may be heated to a desired temperature, to be served as a hot chocolate malted milk drink or beverage and no cocoa or other scum will form on the top during the heating, but, however, the butter fat in the product will rise to the surface to a certain extent and a pleasing, creamy appearance will appear on top of the finished hot malted milk beverage.

What is claimed is:

1. A method of making a malted milk beverage including mixing milk and water proportioned so that the serum solids are not over approximately seven and one-half per cent of the beverage and not under approximately six and one-half per cent of the beverage, heating and agitating the milk and water and adding thereto a mixture of malted milk, sugar, salt, and a stabilizer while maintaining the liquid ingredients at a temperature sufficiently high to dissolve the dry ingredients.

2. A method of making a malted beverage including mixing milk, cream and water and proportioning these ingredients so as to obtain the required amount of butter fat and also so that the serum solids will not exceed approximately seven and one-half per cent of the beverage and not under approximately six and one-half per cent of the beverage, heating and agitating the said liquid ingredients and adding thereto a mixture of malted milk, sugar, salt, and a stabilizer while maintaining the liquid ingredients at a temperature sufficiently high to dissolve the dry ingredients.

3. A malted milk beverage including malted milk, sugar, salt, a stabilizer, milk and water, the proportions of the milk and water being such that the serum solids do not exceed approximately seven and one-half per cent of the beverage and are not under approximately six and one-half per cent of the beverage.

4. A malted milk beverage including malted milk, sugar, salt, a stabilizer, milk, cream and water, the proportions of the liquid ingredients being such that the serum solids do not exceed approximately seven and one-half per cent of the beverage and are not under approximately six and one-half per cent of the beverage.

MARTHA E. TUCKER.